(12) United States Patent
Wanser et al.

(10) Patent No.: US 8,285,798 B2
(45) Date of Patent: Oct. 9, 2012

(54) SYSTEM AND METHOD FOR THE MANAGEMENT OF MESSAGE POLICY

(75) Inventors: Kelly Wanser, Thornton, CO (US); Eve Phillips, Moraga, CA (US)

(73) Assignee: Ecert, Inc., San Francisco, CA (US)

( * ) Notice: Subject to any disclaimer, the term of this patent is extended or adjusted under 35 U.S.C. 154(b) by 324 days.

(21) Appl. No.: 12/759,407

(22) Filed: Apr. 13, 2010

(65) Prior Publication Data

US 2010/0299399 A1    Nov. 25, 2010

Related U.S. Application Data

(60) Provisional application No. 61/169,627, filed on Apr. 15, 2009.

(51) Int. Cl.
G06F 15/16        (2006.01)
(52) U.S. Cl. .............................. 709/206; 709/224; 726/1
(58) Field of Classification Search .................. 709/206, 709/223–224; 726/1
See application file for complete search history.

(56) References Cited

U.S. PATENT DOCUMENTS

| | | | |
|---|---|---|---|
| 6,421,709 B1 | 7/2002 | McCormick et al. | |
| 6,546,416 B1 | 4/2003 | Kirsch | |
| 6,609,196 B1 | 8/2003 | Dickinson, III et al. | |
| 6,691,156 B1 | 2/2004 | Drummond et al. | |
| 6,986,049 B2 | 1/2006 | Delany | |
| 7,039,949 B2 | 5/2006 | Cartmell et al. | |
| 7,134,012 B2 | 11/2006 | Doyle et al. | |
| 7,249,175 B1 | 7/2007 | Donaldson | |
| 7,275,082 B2 | 9/2007 | Pang | |
| 7,533,148 B2 * | 5/2009 | McMillan et al. | 709/206 |
| 7,673,002 B1 * | 3/2010 | Damarla | 709/206 |
| 7,783,711 B2 * | 8/2010 | LeVasseur et al. | 709/206 |
| 7,836,489 B2 * | 11/2010 | Kaler et al. | 726/3 |
| 7,870,205 B2 * | 1/2011 | LeVasseur et al. | 709/206 |
| 7,886,359 B2 * | 2/2011 | Jones et al. | 726/26 |
| 7,925,709 B1 * | 4/2011 | Ben-Yoseph et al. | 709/206 |
| 7,966,492 B1 * | 6/2011 | Gasparini et al. | 713/170 |
| 7,996,467 B2 * | 8/2011 | Maes | 709/204 |
| 8,011,003 B2 * | 8/2011 | Rowney et al. | 726/13 |
| 8,041,953 B2 * | 10/2011 | Spies et al. | 713/176 |
| 8,103,868 B2 * | 1/2012 | Christensen | 713/156 |
| 8,132,250 B2 * | 3/2012 | Judge et al. | 726/13 |
| 2003/0069933 A1 | 4/2003 | Lim et al. | |
| 2005/0210106 A1 | 9/2005 | Cunningham | |
| 2005/0251861 A1 | 11/2005 | Cunningham et al. | |

(Continued)

FOREIGN PATENT DOCUMENTS

WO    WO 2007078577 A2    7/2007

OTHER PUBLICATIONS

Request for Comments: 2821, "Simple Mail Transfer Protocol", The Internet Society, Apr. 2001, p. 1-79.

(Continued)

*Primary Examiner* — Oanh Duong
(74) *Attorney, Agent, or Firm* — Pritzkau Patent Group, LLC

(57) ABSTRACT

A highly advantageous message policy management system and method are disclosed for managing email message flow with a sender set of policies which recommend actions to be taken by receivers based on characteristics of the email message.

82 Claims, 12 Drawing Sheets

U.S. PATENT DOCUMENTS

| | | | |
|---|---|---|---|
| 2006/0031315 | A1 | 2/2006 | Fenton et al. |
| 2006/0224589 | A1* | 10/2006 | Rowney et al. ............. 707/9 |
| 2006/0277597 | A1 | 12/2006 | Dreymann |
| 2007/0208941 | A1 | 9/2007 | Backer |
| 2007/0261121 | A1 | 11/2007 | Jacobson |

OTHER PUBLICATIONS

Request for Comments: 2822, "Internet Message Format", The Internet Society, Apr. 2001, p. 1-51.

Request for Comments: 4408, "Sender Policy Framework (SPF) for Authorizing Use of Domains in E-Mail, Version 1", The Internet Society, Apr. 2006, p. 1-48.

Request for Comments: 4871, "DomainKeys Identified Mail (DKIM) Signatures", The IETF Trust, May 2007, p. 1-71.

Request for Comments: 5617, "DomainKeys Identified Mail (DKIM) Author Domain Signing Practices (ADSP)", The IETF Trust, Aug. 2009, p. 1-21.

BITS and eCERT, "Email Sender Authentication Deployment", BITS and eCert, Jun. 2009, p. 1-44.

* cited by examiner

SYSTEM AND METHOD FOR THE MANAGEMENT OF MESSAGE POLICY

RELATED APPLICATIONS

The present application claims priority from U.S. Provisional Application Ser. No. 61/169,627, filed on Apr. 15, 2009, which is incorporated herein by reference.

BACKGROUND

Electronic mail, or email as it is commonly referred to, is an invaluable resource in today's society. Businesses use email for client contact, transactions, advertising and other communication. Individuals use email to keep in contact with friends and family, for interacting with companies and online services, and for other communications. Email has largely replaced conventional mail, in many situations, due to the relatively rapid transfer of information available with email in comparison to conventional mail, in addition to the cost and convenience advantages offered by email.

The appeal and usefulness of email is diminished if the email recipient cannot trust that a message is from the person or business that it purports to be from. Typically the source address of an email is displayed on the recipient's email program to allow the user to see whom the email is supposed to be from. This display allows the recipient to decide whether to open the email if it is from a trusted source or to delete the email if it is from an unknown or untrustworthy source. However, like other computerized systems, email has been subjected to disruption and attack by computer hackers. Hackers are able to replace the source address of emails, thereby making an illegitimate email appear to be from a trusted source. This practice is referred to as email spoofing. The illegitimate emails are frequently fraudulent, which refers to unsolicited commercial advertisements (spoofed or not), often sent in mass mailings. The hackers replace the source address so the unsuspecting recipient believes that the email is from a known or trusted source and opens the email.

Importantly, spoofing enables perpetrators to leverage the trust a recipient has in a brand, an organization or a person to induce them to actions that may include sharing personal information, completing a financial transaction or downloading malicious software onto their computers A common and dangerous form of spoofing, commonly called "phishing", occurs when email that is purportedly from a trusted source is used to gather sensitive information on the recipient. The sensitive information is later be used to access the recipient's bank accounts or for other nefarious purposes. These email scams are typically criminal and frequently originate from outside the recipient's home country by criminal organizations or individuals.

Similarly, these unsolicited emails can contain computer virus and/or Trojan horses that can be used to leverage the machine to send anonymous malicious correspondence to others, to display false screens to gather data from the user, to capture keystrokes or data on the machine or to cause damage to the recipient's computer. In order to influence a recipient to open such an email, a hacker will substitute the actual source of the email with a trusted source name, such as the name of a well known brand or institution.

Security systems have been developed to combat email source address spoofing. A conventional email message transfer with source address authentication is illustrated by message flow chart 100 in prior art FIG. 1. In this transfer, an email message is generated by an Originator at 102. The Originator can be, for instance, a person generating one or more messages individually, or an electronic system for generating multiple emails. Typically a person generates the message using a web-based or client based email program on a personal computer. The message consists of a header and a body. The body contains the text information that the Originator wants to communicate to a Recipient. The header usually contains the email addresses of the Recipient and Originator, and can also contain a subject line, date and other information such as information used for authenticating the email. The Originator types the text into the body and enters the Recipient's email address and subject into the header. The Originator then pushes a "send" button in the email program which submits the message for delivery to a network operator, also referred to as a Sender, at step 104. After receiving the message from the Originator, the Sender electronically transmits the message, at step 106, generally through the Internet to a receiving network, referred to herein as the Receiver.

The appropriate Receiver is determined from a plurality of different Receivers using the Domain Name System (DNS) and the Recipients email address, obtained from the header of the message. The part of the email address following the "@" symbol is usually one or more domain name words that are easily remembered by people. The DNS is used for translating the word domain names into binary numerical identifiers that are used to electronically identify the corresponding Receiver. The DNS can also contain other information that is related to particular domain names. In the present example, at some point before passing along an email message to a Receiver, the Sender publishes appropriate authentication information for the Sender's domains and subdomains in the DNS at step 108.

The appropriate Receiver receives the message from the Sender at step 110 and discerns the domain or subdomain of the message's Sender from the header. The Receiver looks up the relevant domain or subdomain information from the Sender's DNS and authenticates the message using information published by the Sender in the DNS and information present in the message at step 112.

Sender Policy Framework (SPF) is one email authentication technique used for authenticating the sender of the email. In this technique, only certain hosts, or computer systems, are allowed to send emails for certain domain names. The authorized hosts for a given domain name are published in the DNS. Receivers check the DNS to make sure that the received message is from a host that is authorized for the given domain. Another email authentication technique is called Domain-Keys Identified Mail (DKIM) and uses public key cryptography in verifying the source and content of emails.

The Receiver determines if the message passes the authentication processes applied at step 114. If the message fails authentication, the Receiver may apply a failure action to the message at step 116. If the message passes authentication, the Receiver may apply a delivery action to the message at step 120.

In this conventional message flow, the Receiver can choose from a variety of delivery actions. These options include: "delivery to inbox," "deliver to spam folder," or any other supported delivery mechanism that the Receiver chooses. The Recipient receives the message from the Receiver as determined by the Receiver's chosen delivery action in step 122. For example, the Recipient may receive an authenticated message in the inbox of his email program.

Prior systems have relied on the Receiver to decide what to do with a message based on the outcome of the authentication and other selection criteria as chosen by the Receiver. However, this reliance has yielded limitations based on a lack of reliable instructions or 'policies' from Senders that can relate authentication results to actions that can be safely enforced by the Receiver without either eliminating valid messages or allowing fraudulent messages undue safe passage.

Senders do not have an effective way to communicate policy information to Receivers that would enable them to indicate that their instructions can be trusted, pertain to multiple message characteristics, relate message characteristics to authentication or provide fine-grained policy on multiple authentication protocols.

Specifically, for the effective deployment of email authentication against the problem of domain spoofing, there are issues with existing authentication protocols that can lead Receivers to downplay the outcomes of authentication checks in determining subsequent actions taken on messages (e.g. decisions about whether or not to deliver them).

First, the mechanisms for Senders to efficiently communicate to Receivers the protocols they use for each domain are limited. Second, policies available for each protocol have generally been limited to broad instructions based solely on success and failure outcomes that do not include any additional message characteristics or interim stages of activity (e.g. testing) or all possible authentication outcomes.

For example, the DKIM protocol has an optional extension called Author Domain Signing Practices (ADSP) that allows a Sender to indicate whether, in conjunction with a DKIM signature for a given domain, the domain signs some or all of its messages, and it may request that the Receiver discard unsigned messages. However, this model does not allow the Sender to request fine grained policy actions (beyond the general "discard"), nor does it allow policy requests to be made in combination with other protocols, like SPF. Finally, it does not support a message handling reporting channel back to the Sender from the Receiver. SPF also has a policy mechanism that allows the Sender to request that messages that fail SPF are either rejected or "softfailed"; however, the problems with SPF make using this policy for any domains that actually send email highly problematic, since many legitimate emails will be rejected.

Third, Receivers have no independent means of verifying the currency and accuracy of any policy information published. If the Sender's email traffic includes important messages to customers of the Receiver, the Receiver seeks the ability to ensure information accuracy to prevent blocking these important messages (particularly on a large scale).

Fourth, messages legitimately authenticated by the Sender may have their authentication paths or signatures broken en route to the Receiver by forwarding systems and other interim networks, in association with the design of any one particular authentication protocol. These legitimate messages will not be accurately authenticated by the Receiver. In this last case, using multiple authentication methods is key to overcoming the issues with each authentication protocol, since the likelihood of multiple failures is quite small. However, current policy communication mechanisms work (in their limited way) for a single protocol only. Senders who use multiple authentication protocols may have special delivery instructions for the Receiver based the combination of those authentication outcomes, but there are no current mechanisms to communicate those combined policies.

In summary, if a Receiver had fine-grained, trusted instructions from the Sender regarding the characteristics of a message, the authentication protocols used and the specific action requested based on each used protocol, the Receiver could then enforce those requests and help prevent illegitimate mail from appearing in a Recipient's inbox and deliver valid messages with any desired privileges. In addition, the current policy communication schemes provide little feedback to the purported Sender regarding the handling of their messages. Without a structured mechanism for Receivers to report back the handling statistics to Senders, Senders are limited in their ability to "complete the loop" of information and understand if their messages are being properly authenticated and delivered, as well as who is attempting to send messages via their domains.

This structured mechanism that supports the important case of managing fine grained, trusted instructions for the effective enforcement of authentication against the problem of email domain spoofing, also enables a myriad of other security, delivery and display enhancements for email messages that are enabled by the effective communication and enforcement of detailed instructions about email traffic from a domain or host.

The present invention provides a highly advantageous message policy management system and method that are submitted to resolve the foregoing problems and concerns while providing still further advantages, as described hereinafter.

SUMMARY OF THE INVENTION

The present invention overcomes the limitations of conventional message policy management systems. In one embodiment, according to the present disclosure, a method is disclosed involving a system that is interfaced through the Internet for use in conjunction with email messaging in which at least one originator sends at least one email message via a sender to at least one recipient as an addressee of the email message. The email message is deliverable to the recipient via a receiver of the email message. A policy repository is configured for storing at least one set of policies that is defined by the sender and which includes at least one recommended action to be taken on the email message by said receiver based on at least one characteristic of the message. Controlled access is facilitated to said policy repository by the sender to define the set of policies. The set of policies is distributed to the receiver by providing controlled access to the policy repository by said receiver in order to allow the receiver to determine at least one sender recommended action for the email message from the sender based on the characteristic of the email message.

In another embodiment, a method is disclosed involving a system that is interfaced through the Internet for use in conjunction with email messaging. In the system, originators send email messages, via a sender, to recipients as addressees of the email messages which are deliverable to the recipients via receivers of the email messages. A set of policies is stored in a policy repository for access by the receivers. Each of the sets of policies are defined by one of the senders and the sets of policies include sender recommended actions to be taken by the receivers based on multiple email message characteristics in each email message. The message characteristics are determinable by the receivers for the email messages after the email messages are sent by the senders and received by the receivers. The sets of policies are stored in the policy repository by the senders prior to the receivers acting on the email messages.

In still another embodiment, a method for controlling email message flow in a system is disclosed. In this method at least one originator sends at least one email message, via a sender, to at least one recipient as an addressee of the email message. The email message is deliverable to the recipient via a receiver of the email message. A selection of email characteristics are supplied to the sender. The email characteristics are determinable by the receiver upon receipt of the email from the sender, and a selection of possible actions to be taken by the receiver based on one or more of the email characteristics are also supplied to the sender. The supplied characteristics and actions are supplied to the sender such that the sender can select a recommended action for a given email characteristic determined by the receiver to produce a sender set of policies for email disposition that is loadable to a policy repository. The policy repository can be accessed by at least one receiver so that the receiver can determine the sender recommended action to be taken for the email depending on the characteristic determined by the receiver.

BRIEF DESCRIPTION OF THE DRAWINGS

Prior Art

DETAILED DESCRIPTION OF THE INVENTION

Figure 1:
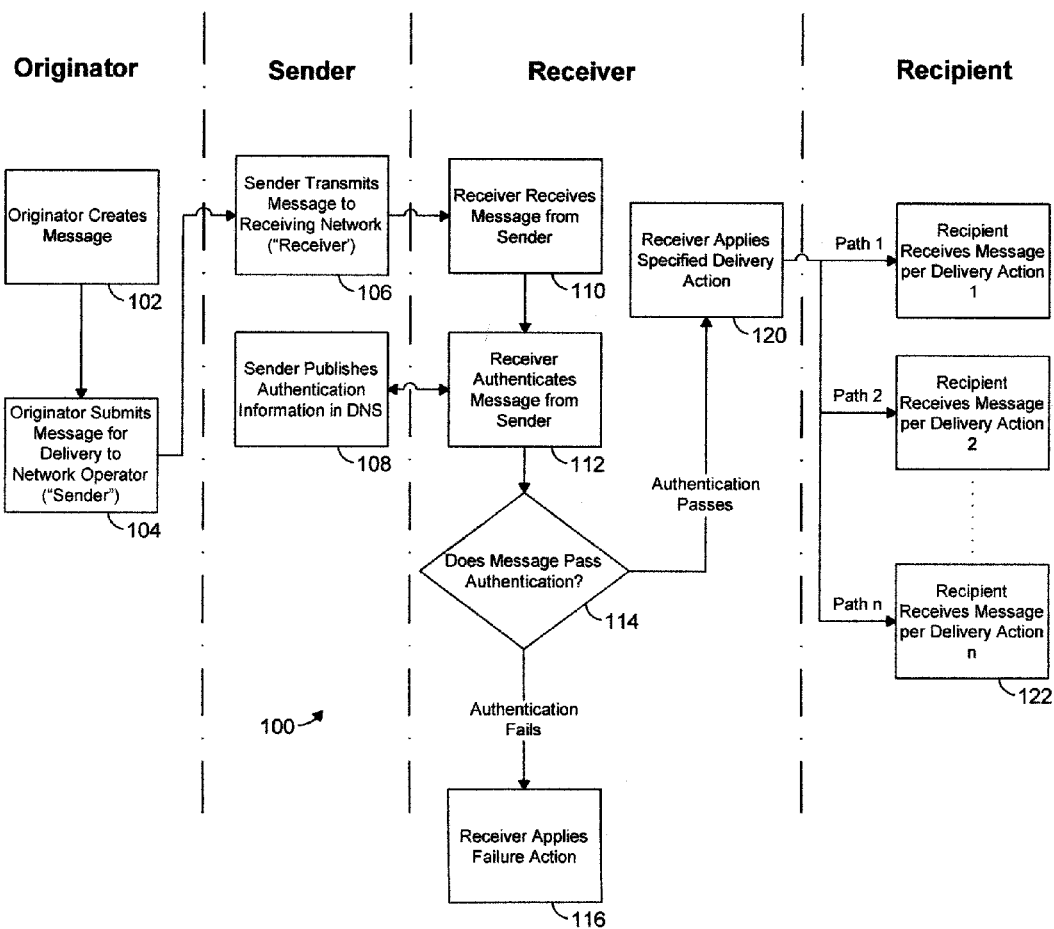
FIG. 1 is a message flow diagram for a message in a traditional email system.

While this invention is susceptible to embodiment in many different forms, there are shown in the drawings, and will be described herein in detail, specific embodiments thereof with the understanding that the present disclosure is to be considered as an exemplification of the principles of the invention and is not to be limited to the specific embodiments described. Descriptive terminology may be adopted for purposes of enhancing the reader's understanding, with respect to the various views provided in the figures, and is in no way intended to be limiting.

Figure 2:
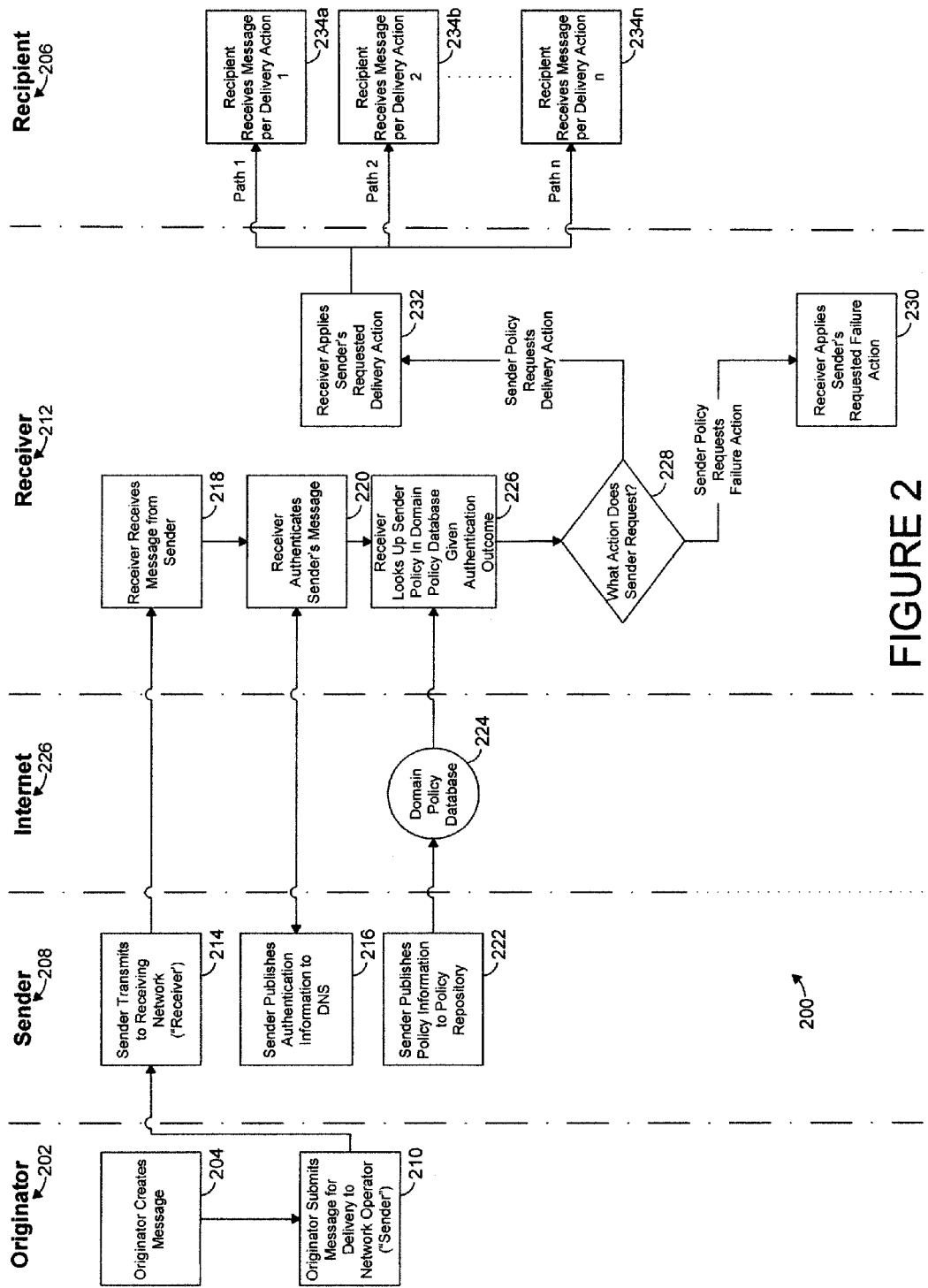
FIG. 2 illustrates one embodiment of an email message flow for a method using a single email message characteristic.

Referring to the drawings, wherein like components may be indicated by like reference numbers throughout the various figures, FIG. 2 illustrates one embodiment of an email message flow generally indicated by the reference number 200. In the embodiment shown in FIG. 2, an originator 202 creates an email message at step 204. The originator can be an individual who types an email message into an email program on a personal computer or other type of message originator such as an automatic email message generator used by some businesses. The created email message includes a recipient email address that designates an intended recipient 206 of the message.

The originator submits the message for delivery to a network operator or sender 208 at step 210. The message may be sent in one of many ways, including by clicking a "send" button within a web-based or client based email program. The sender appends one or more domains and subdomains to the message that have information published in the Domain Name System (DNS).

The sender receives the message from the originator and transmits the message to an appropriate receiving network or receiver 212 at step 214 based on the recipient's email address included in the message. The receiver is one of a plurality of receivers available and is distinguished from the other receivers using the recipient's email address. When the message is transmitted to the receiver, the message also contains the email address of the originator which includes the domain name of the sender.

In this embodiment, the sender publishes appropriate authentication information for the sender's domains and subdomains in the DNS at step 216. This authentication information can be used in authenticating the source or internet protocol address of the email message using an email authentication technique, such as DomainKeys Identified Mail (DKIM) or Sender Policy Framework (SPF), or others. In the present embodiment, a single one of these sender authentication methods is used.

The receiver receives the email message from the sender at step 218 and discerns the domain or subdomain of the message's sender. The receiver electronically looks up the sender's relevant domain or subdomain authentication information from the sender's DNS. The receiver authenticates the message using the information from the DNS and information present in the message at step 220. While step 220 has been framed in terms of the receiver using authentication for purposes of clarity, the use of authentication is not a requirement. More particularly, as is the case with respect to authentication steps subsequently described, in other embodiments the receiver can base the decision on characteristics as described immediately hereinafter.

The authentication information in the message is an example of a message characteristic which the receiver can determine from the message after it is received from the sender. Other characteristics of the message can also be determined by the receiver and used in one or more of the methods described herein. Characteristics can include aspects of the message that will indicate to the receiver that a policy should be applied, such as the domain that the message is from or other domains in the message. Other examples of other message characteristics include: header information, body content, other domains included in the message, presence of attachments, types of attachments, geographic location of the host, information generated in the delivery process of the message, envelope domain information and others.

In the present embodiment, once the authentication of the message is complete, the message is either authenticated or not authenticated. If the message is authenticated then the message is determined to have originated at the originator as it is purported to have been. On the other hand, if the message is not authenticated, then the message may be forged and may not have been created by the originator as purported. At this point, a decision has to be made regarding what to do with the message based on the authentication of the message. In the prior traditional message flow method, such as the method shown in Prior Art FIG. 1, the receiver would be responsible for determining what to do with a received message based on the authentication outcome.

Rather than let the receiver alone decide what to do with received messages based on the authentication, in the present embodiment, the sender sets a policy for handling each of the possible outcomes of the authentication procedure. For example, if the sender does not support any authentication protocols, then they would not request that the receiver fail the message if it does not pass any authentication protocols. In another example, if the sender does support two authentication protocols, then they may designate a "strict" policy that instructs the receiver to drop the message if both protocols are not passed. In the present embodiment, the sender will publish the appropriate policy information for each of the sender's domains and subdomains prior to passing any message to one or more receiver. The sender can define the set of policies using a graphical user interface, as will be discussed. The sender publishes the policy information at a step 222, in FIG. 2, to a policy repository, such as a domain policy database 224 located in the Internet 226. The domain policy database is configured for storing the sender defined set of policies and allows controlled access to the sender to define the set of policies. Access to the policy database from the sender and/or receiver can be controlled using encryption and the information stored in the policy database can also be encrypted for additional security.

In the present embodiment, after the receiver authenticates the sender's message in step 220, the receiver electronically looks up the relevant policy instructions for the given message from the sender's sender specific policy set in step 226. The set of policies is distributed to the receiver by allowing the receiver controlled access to the domain policy database. The receiver looks up the policy instructions from the domain policy database, based on the domain and/or subdomain of the sender, obtained from the message, and the outcome of the authentication process.

After the receiver has obtained the policy instructions, the receiver determines what action the sender requests from the policy instructions at step 228. In the present example, this action may be either a delivery action or a failure action. If the sender requests a failure action, the receiver can apply a fail action to the message at step 230, such as "discard", "bounce", or "reject". With a discard fail action the message is simply discarded without generating any sort of response or notification. A bounce fail action is an automatic response to the message that is sent back through the sender to the originator and which informs the originator that the message could not be delivered. A reject fail action also typically generates an automatic response to the message that is sent back to the originator.

If the receiver determines that the sender requests a delivery action at step 228, the receiver applies the requested delivery action to the message at step 232. The receiver executes the requested delivery action, which may be one of several possible delivery actions, such as "deliver to inbox", "deliver to spam folder", or any other supported delivery mechanism. After the receiver executes the requested delivery action, the recipient receives the message from the receiver using one of the paths 1-3 as dictated by the selected delivery action method at steps 234a-234n, one of which may be deliver to the recipient's inbox, for example.

Although the present embodiment shows three potential delivery actions, more or fewer delivery or other actions may be used. The delivery and failure actions are examples of disposition type actions for disposition of the message for delivery. Other policy actions can also be used, such as: displaying characteristics of the message, allowing or restricting specific content in the message, alteration of the message in a predetermined way, converting the message to another protocol format, assigning the message to a thread, duplicating the message, archiving the message, classifying the message, and others.

The message can be classified according to a common set of parameters with other messages. This classification can be according to the outcomes of one or more authentications including Internet addresses, Internet protocol information, uniform resource locator information, a time at which the message arrives at one or more receivers, or can involve summary statistics for messages or a listing of senders, among other things. The information collected can be displayed to the sender or receiver graphically or numerically in a graphical user interface. Rules can be applied to the information collected to identify potential security threats to the senders and/or receivers and an electronic alert can be used to notify the sender and/or receiver of one or more of the identified potential security threats. The rules can be based on characteristics of a single message or on a collection of messages. For example, a higher than typical failure rate, or an increase in messages appearing to originate outside the United States, or an increase in messages failing from known approved IP addresses could all trigger alerts.

The recommended action in the set of policies can also be for the message to be certified. The certified action requires that the message be delivered with potential added features, such as the enablement of links and images within the message body or a message indicator within the recipient's email inbox display.

Figure 3:
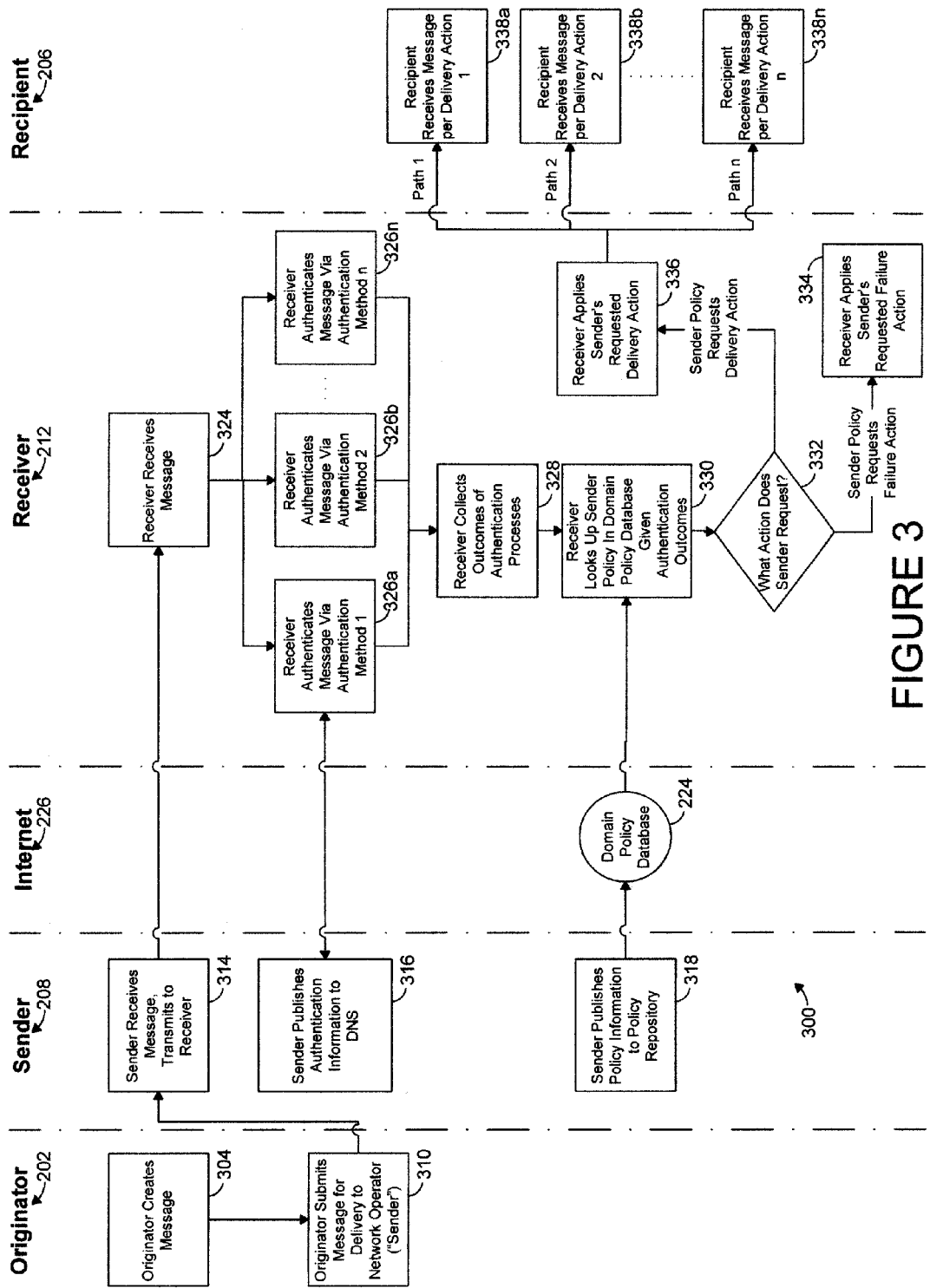
FIG. 3 illustrates an embodiment of an email message flow for a method using multiple email message characteristics.

Another embodiment of a message flow method is shown in FIG. 3 and is generally indicated by reference number 300. In this method, as will be discussed in more detail, the message is authenticated by the receiver by multiple methods. In this instance, the message includes multiple characteristics with information needed by the receiver in authenticating the email using the multiple methods. In this embodiment, the authentication can be used for authenticating a purported internet protocol address of the origin of the message and/or a purported domain of the origin of the message. The message starts, for example, with originator 202 creating an email message at 304 using an email program. The message is designed for delivery to specific recipient 206 and is addressed to the recipient and includes the email address of the originator. The originator submits the message for delivery via network operator sender 208 at a step 310, for example, by clicking a send button in the email program.

The sender receives the message from the originator and passes the message along to the appropriate receiver 212 at step 314. The appropriate receiver 212 is determined from a plurality of available receiving networks by the recipient's email address.

Prior to passing along email messages to one or more receiving networks, the sender publishes appropriate authentication information for the sender's domains and subdomains in DNS, as necessitated by the DKIM or SPF protocol, as shown in FIG. 3 at step 316. Also before passing along email messages, the sender publishes appropriate policy information at step 318 for each of its active domains and subdomains into domain policy database 224 in the Internet 226.

Once the message is passed to the appropriate receiver at step 314, the receiver receives the message from the sender at step 324 and discerns the domain or subdomain of the sender of the message. The receiver then electronically looks up the domain or subdomain authentication information of the sender's message from the sender's published information in the DNS and authenticates the message at steps 326a-326n using multiple authentication techniques. The receiver authenticates the message using the information from the DNS and the characteristic of the message in that the message contains information for authenticating the message. The authentication methods can be techniques such DKIM, SPF, and/or other methods. Each of the authentication methods are conducted independent from one another, in this embodiment. Although there are three authentication methods shown and used in the present embodiment, two or more authentication techniques can be used and the techniques can be the same or different from one another, or a combination of the same and different techniques can be used. Moreover, the authentication techniques can be any current suitable techniques or a suitable technique that is yet to be developed.

The receiver collects the results of the outcomes of the various authentication methods at step 328. The receiver electronically looks up the appropriate policy instructions from the Sender's sender specific policy set for the disposition of the message from the domain policy database based on the domain or subdomain of the sender obtained from the message and the outcomes of the authentication processes at step 330. The policy may be determined by the combined outcomes of the authentication processes. The policy set can also include instructions for wildcarding. Wildcarding is where the sender instructs the receiver to apply policy and send reporting information, on messages that appear to be from an unregistered subdomain of a registered domain.

The receiver then determines what type of action the sender requests, either a delivery action or failure action, at step 332. If the sender requests a failure action, the receiver will apply the failure action to the message, such as "discard", "bounce", or "reject" at step 334. If, on the other hand, the sender requests a delivery action, the receiver will then execute the requested delivery action at step 336. The delivery options can include "delivery in inbox", "deliver to spam folder", or any other supported delivery mechanism. The recipient receives the message from the receiver as dictated by the selected delivery action method, in at least one of steps 338a-338n, via paths 1-n, respectively. More or fewer possible delivery actions can be used.

Method 300 shown in FIG. 3 and described above offers the advantage of authenticating a message using multiple authentications. Method 300 also allows the sender to publish a policy or policy set for authentication outcomes based on more than one authentication protocol. This method is an illustration of a sender policy set that uses multiple characteristics of the email message for determining sender recommended actions. Applicants are not aware of any authentication procedure heretofore that is capable of determining a policy based on multiple authentication procedures that each produce an independent outcome.

Figure 4:
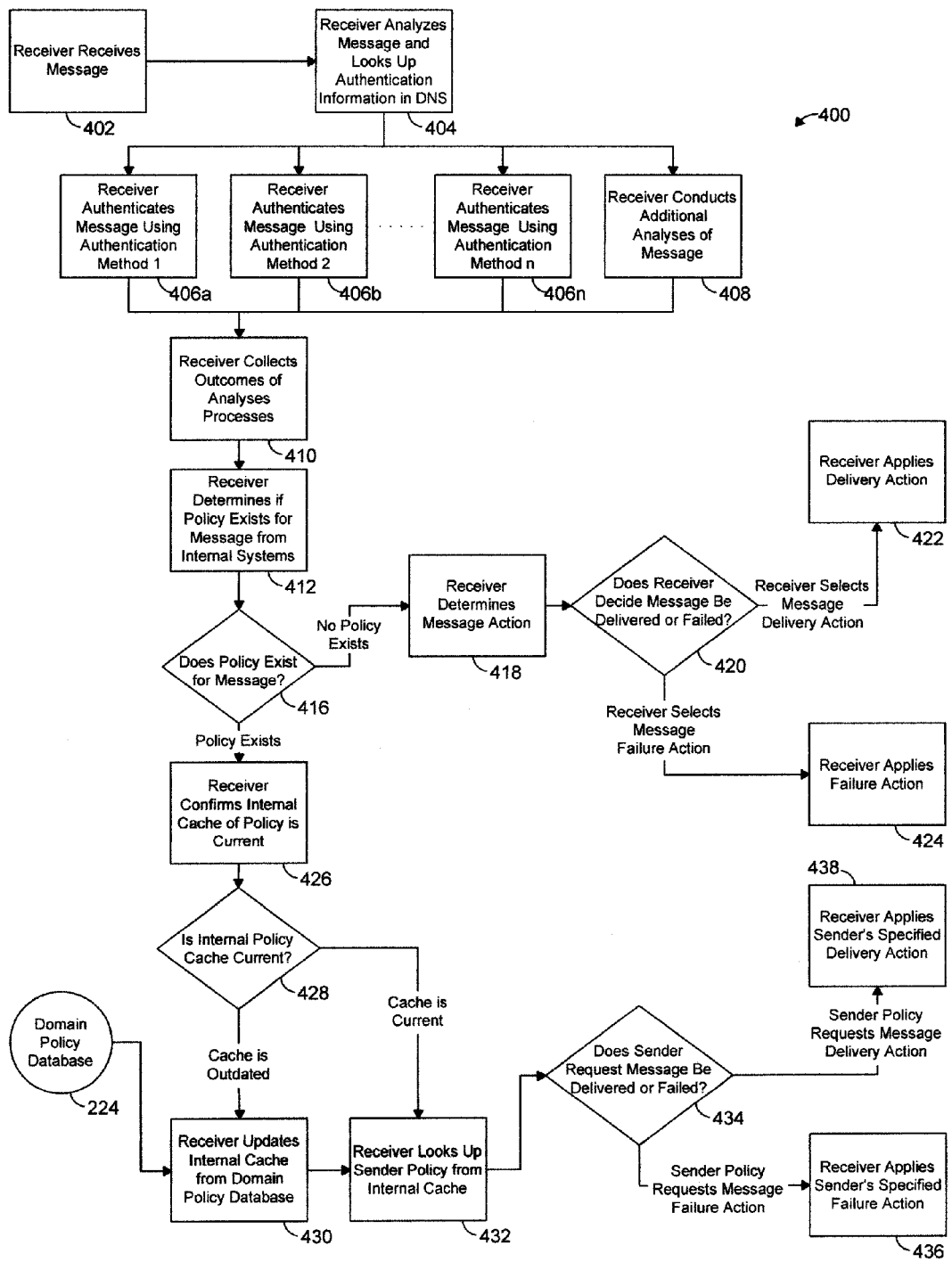
FIG. 4 illustrates an embodiment of an email message flow for another method using multiple email message characteristics in which a receiver includes an internal cache.

Another embodiment of a message flow method is shown in FIG. 4 and is generally indicated by reference number 400. In this method, a message is received by the receiving network or receiver, at step 402, and discerns the relevant domain or subdomain of the sender of the message. The receiver looks up the authentication information of the domain or subdomain of the sender of the message in the DNS at step 404. The receiver then authenticates the message at steps 406a-406n using a variety of authentication methods, such as DKIM, SPF or others. There can be more or less authentication techniques used than those shown in the embodiment of FIG. 4, or other message characteristics can be utilized. The receiver may also conduct additional, non-authentication based, analysis of the message to determine the quality of the message, such as message text analysis, as shown in step 408 or other characteristic of the email message. Each of the methods in steps 406a-406n and 408 can be conducted independent from one another.

The receiver then collects the results of the outcomes of the various authentication methods at step 410. The receiver then determines, at step 412, if the message comes from a domain or subdomain that publishes policy in domain policy database 224. The receiver determines if a policy is published by checking an internal system or policy cache of the receiver at step 416. If the message comes from a domain or subdomain of a sender that does not publish policy, the receiver can then determine the action for the message at step 418. The receiver decides whether to apply a delivery or failure action for the message at step 420. If the receiver decides to apply a delivery action to the message, the receiver can choose from a variety of delivery actions to apply to the message, at step 422, such as "deliver to inbox" or "deliver to spam folder", among others. If the receiver decides to apply a failure action to the message, the receiver can choose from a variety of failure actions to apply to the message, at step 424, such as "discard", "bounce", or "reject", for example.

If the message comes from the domain or subdomain of a sender that does publish policy, the receiver may electronically confirm if the internal cache of the sender's policy is current at step 426. The receiver can check to see if the internal policy cache is current by one or more methods. In one embodiment, a policy cache may be considered to be current dependent on the age of the cache or the time since the cache was last updated. In another embodiment, the cache may be considered to be current dependent on whether any alerts that the receiver's cache should be updated were received by the receiver from the domain policy database since the receiver's last update. The determination of whether the policy cache is current is made at step 428.

If the internal policy cache of the receiver is outdated, the receiver can, at step 430, electronically update the cache from the domain policy database 224. Once the cache is updated at step 430, or if the cache is determined to be current at step 428, then the receiver looks up the sender's policy from the receiver's internal cache at step 432. The sender's policy is looked up based on the domain or subdomain of the sender obtained from the message and the outcome of the authentication processes using characteristics of the email message. The sender's policy can also be based, at least to some degree, on the message text analysis. The receiver then determines what type of action the sender requests at step 434, either a delivery action or a failure action. If the sender requests a failure action, the receiver applies the sender's specified failure action to the message at step 436. If the sender requests a delivery action, the receiver then applies the requested delivery action at step 438.

Figure 5:
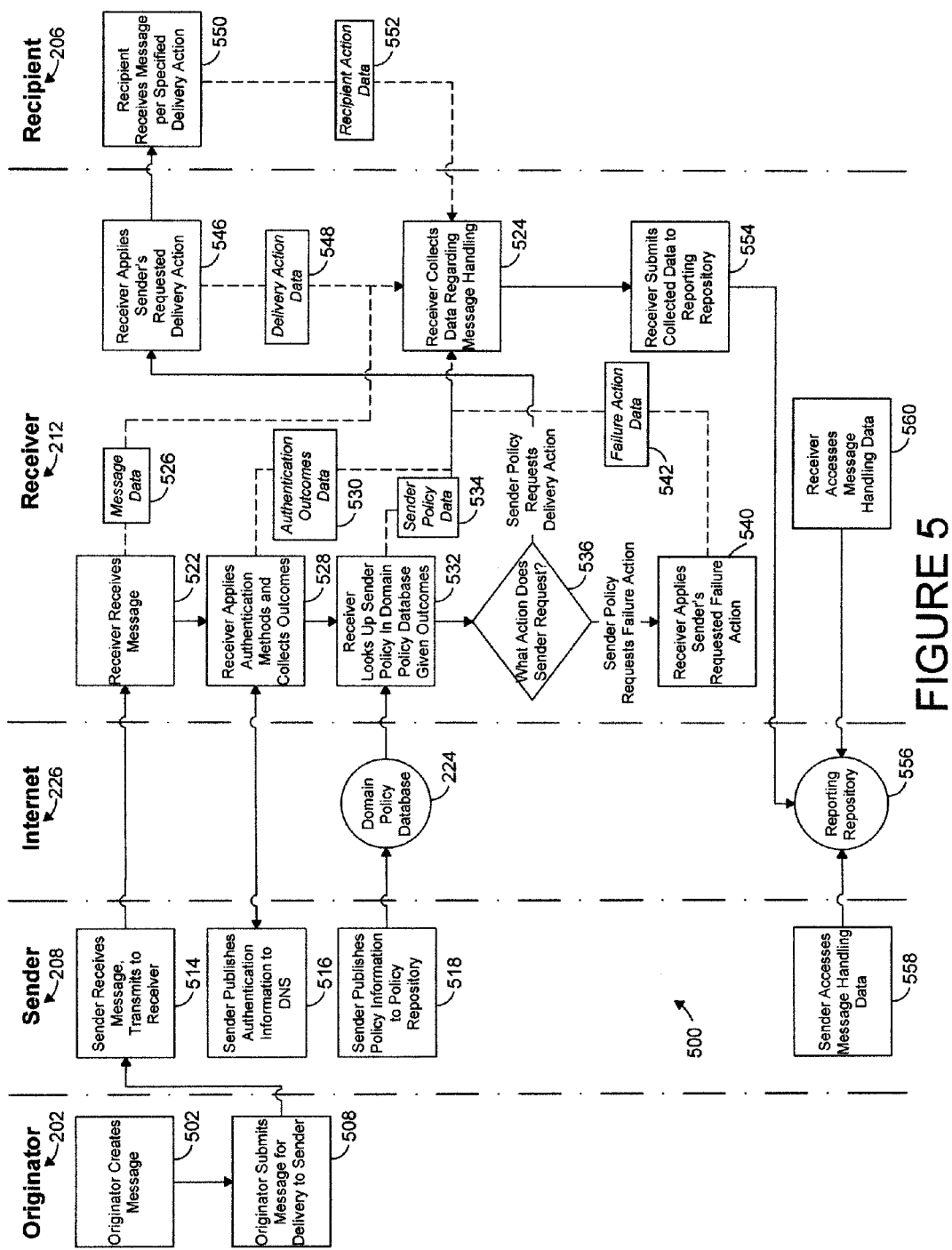
FIG. 5 illustrates an embodiment of an email message flow for another method using multiple email message characteristics in which a receiver stores data in a reporting repository.

Another embodiment of a message flow method is shown in FIG. 5 and is generally indicated by reference number 500. In this method, an email message is created at a step 502 by originator 202. The email message is addressed to specified recipient 206. The originator submits the message for delivery, at step 508, via sender 208 by, for example, clicking a "send" button within a web-based or client based email program. The sender receives the message from the originator and passes it along to the appropriate receiver 212, at a step 514, as determined by the recipient's email address.

Prior to passing along email messages from the originator, the sender publishes appropriate authentication information for one or more domains and subdomains of the sender in DNS at step 516. Also prior to passing along email messages from the originator, the sender publishes appropriate policy information, (at step 518), for each of its active domains and subdomains in domain policy database 224 on the Internet 226.

The appropriate receiver, as identified among a plurality of receivers, receives the message from the sender and discerns the relevant domain or subdomain of the sender of the message and collects message data at step 522. The message data is sent to an internal reporting repository 524 in the receiver at a step 526 which is accomplished as a background activity to the handling of the message. Background steps are shown in FIG. 5 interfaced with the main process using dashed lines. In one embodiment, the internal reporting repository can be electronic memory at the receiver that is configured for storing various parameters, including data about messages, information resulting from analysis of the messages, sender policy data, recommended action data, receiver action taken on the message, and/or other information. The policy repository and reporting repository can also be configured into the same storage device. The reporting repository can also be separate from the policy repository and can be configured to collect information from a plurality of receivers.

After the receiver receives the message, the receiver looks up the message sender's relevant domain or subdomain authentication information DNS at step 528 in this embodiment. The receiver also authenticates the message using the information from DNS and characteristic information from the message, and collects information or data related to the outcome of the authentication in the same step. The authentication outcomes data is sent to the receiver's internal reporting repository at step 530, which, in this embodiment, is accomplished as a background activity.

When the receiver has authenticated the message, the receiver then looks up the appropriate message policy instructions from the sender's sender specific policy set from the domain policy database, based on the domain or subdomain of the sender (from the message) and the outcome of the authentication process and collects data on the sender policy at step 532. In this embodiment, the sender policy data is sent to the receiver's internal reporting repository as a background activity at step 534.

The receiver then determines what type of action the sender requests for the given result of the authentication at a step 536. In this embodiment, this action can be either a delivery or failure action. If the sender requests a failure action, as represented by step 538, the receiver will apply a failure action to the message, such as "discard", "bounce", or "reject" at a step 540. The receiver also collects failure action data which is sent to the receiver's internal reporting repository, for example, as a background activity at step 542.

If the sender requests a delivery action, as represented by step 544, the receiver applies the delivery action to the message, such as "deliver to inbox", and collects delivery action data at step 546. The collected delivery action data can be sent to the receiver's internal reporting repository as background activity at step 548. After the receiver applies the delivery action, the recipient receives the message at step 550 from the receiver as dictated by the selected delivery action, such as in the recipient's inbox. The receiver also collects recipient action data related to the recipient and/or the delivery of the message to the receiver as background activity at a step 552.

Receiver 212 can collect information from each step of the message handling into the receiver's internal repository. In the present embodiment, the receiver collects several different types of information data about the handling of the message. Other types of message related data can also be collected. At predetermined intervals, the receiver can securely submit the collected data, at step 554, to an external system reporting repository 556. The reporting repository system can standardize information from the receiver and from other receivers (not shown in the present example) to a common set of parameters. These parameters may include: time period data, message authentication outcomes, internet protocol (IP) addresses of messages, URLs contained in the messages, and message senders, among others. The reporting repository system can be used to compute averages and other summary statistics of the collected data.

The sender can log onto the reporting repository to view the message information collected, as shown in step 558. The message information can be viewed graphically and/or numerically via a graphical user interface. Message handling information can be viewed for every different receiver that participates in the information collection and reporting. Message information can be summarized and can be filtered for viewing by the Senders, for example by: date, authentication method, authentication result, action taken or other parameters.

The receiver can also log onto the reporting repository to view the message information, as shown in step 560. This message information can also be viewed graphically and/or numerically via a graphical user interface. However, in the present embodiment, each receiver can only view message handling information for messages that it handled. The receiver can view messages, including summaries, filtered by (for example): date, authentication method, authentication result, or action taken.

Figure 6:
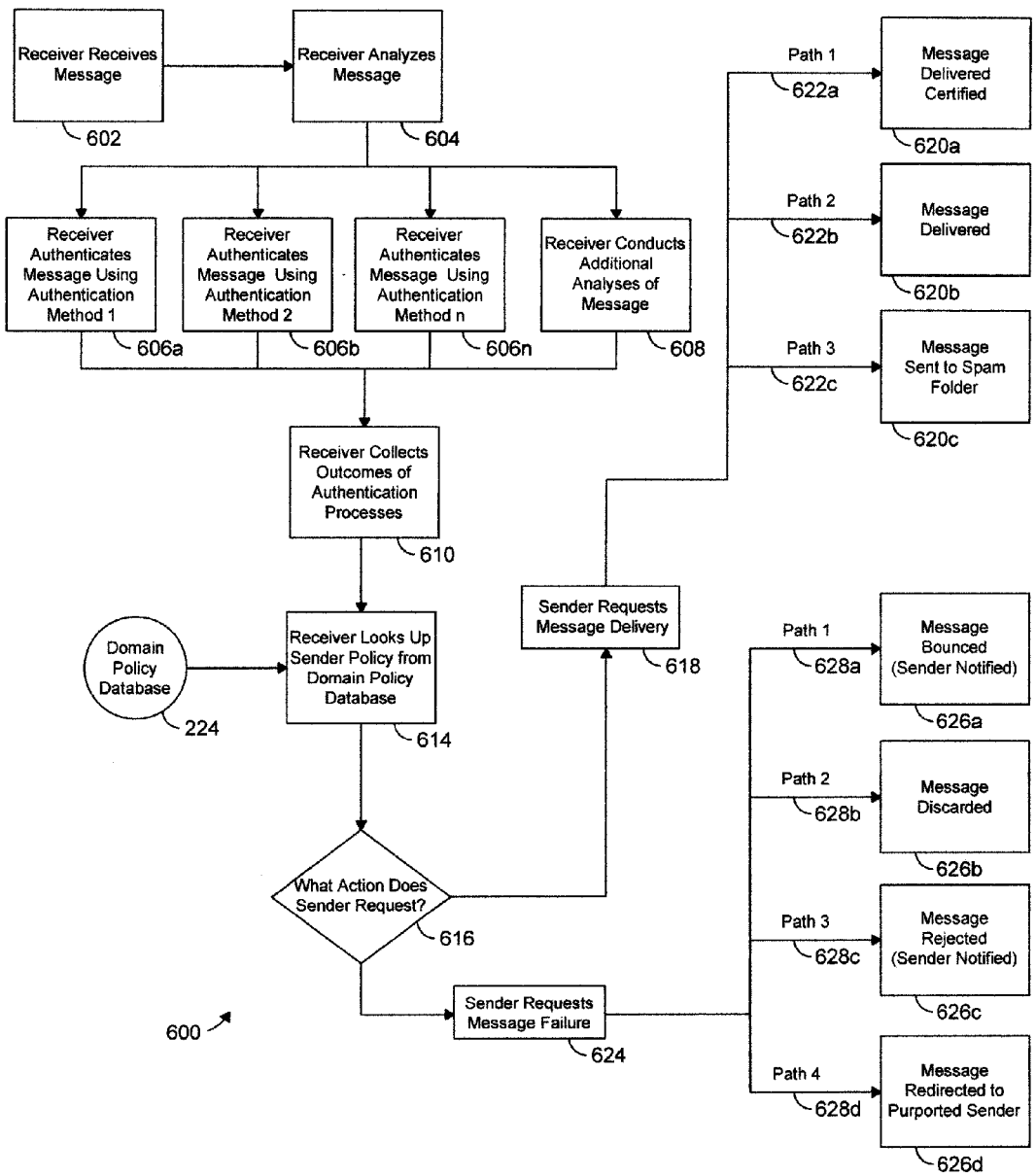
FIG. 6 illustrates an embodiment of an email message flow for a receiving network message handling method.

FIG. 6 shows a flow diagram 600 that illustrates an embodiment of a message flow of an email message starting with a step 602 where the message is received by a receiving network, or receiver from the sender and discerns the domain or subdomain of the sender of the message. The receiver then looks up the message's sender's domain or subdomain authentication information from the sender's DNS at a step 604. The receiver authenticates the message, using information from the DNS and characteristic information present in the message, by a variety of authentication methods shown in steps 606a-606n. These methods or techniques can be DKIM, SPF or other methods. The receiver may also conduct additional, non-authentication based, analysis of the message to determine the message's quality, such as message text analysis at a step 608. Each of the authentication and analysis steps can be conducted independently.

The receiver collects the outcomes of each of the authentication methods and any additional analysis of the message at a step 610. The receiver then looks up the sender's policy from domain policy database 224, at step 614. The policy is based on the message sender's domain and the outcome of the authentication processes. The receiver receives the type of action that the sender requests at step 616. In this case, the action is either a delivery action or a failure action. If the sender requests a delivery action, as shown by step 618, the receiver will apply a particular specified delivery action to the message in one of steps 620a to 620c, in this embodiment. The requested delivery action can be for the receiver to: "deliver to inbox certified" (620a) by sending the message down a first delivery path 622a; or "deliver to inbox" (620b) by sending the message down a second delivery path 622b; or "deliver to spam folder" by sending the message down a third delivery path 622c.

If the sender requests a failure action, step 624, the receiver will apply the specified failure action to the message at one of steps 626a-626d. The sender will have requested a particular one of the failure actions that the message could take. In the present embodiment, the requested failure action, in a first instance, can be "bounce" by sending the message down a first failure path 628*a* and in which case the sender is notified of the message disposition. In a second instance, the requested failure action can be "discard" by sending the message down a second failure path 628*b* in which case the message is discarded without notification to the sender. In a third instance, the failure action can be "reject" by sending the message down a third failure path 628*c* where the sender is notified. In a fourth instance, the failure action can be "redirect" by sending the message down a fourth failure path 628*d* in which case the message is redirected to the purported sender of the message.

Figure 7:
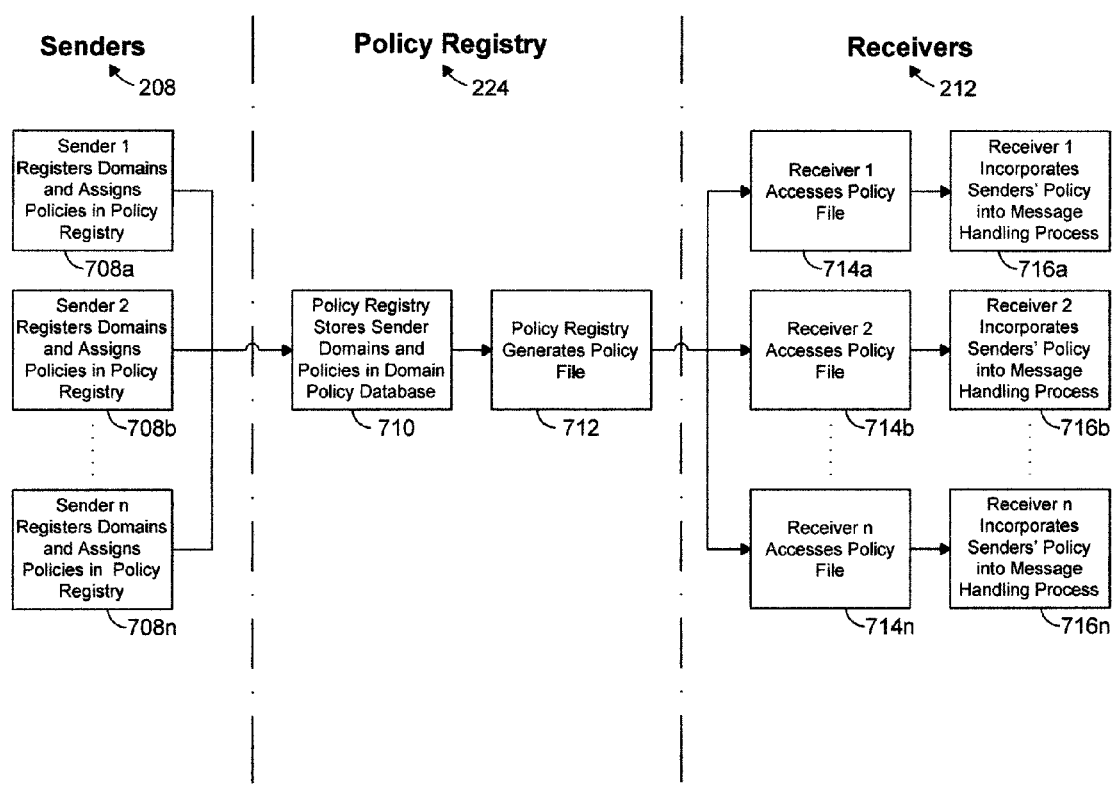
FIG. 7 illustrates an embodiment of a message handling policy method.

FIG. 7 is a flow diagram 700 that illustrates an embodiment of a flow of policy instructions in a situation where there are multiple senders 208 and multiple receivers 212. In this embodiment, the senders register their domains, and an associated policy for each of the domains, in policy registry or repository 224 which is configured for storing multiple sets of polices and which generates a policy file. Access to the repository is controlled so that each sender can access the repository to update or set their respective set of polices. The receivers can access the policy file in the repository remotely and incorporate the various senders' policies into their message handling processes.

Each sender registers its domains in the policy registry at steps 708*a*-708*n*. The sender also assigns a policy for each domain that states how messages that purport to be from that domain should be handled by the receivers based on one or more characteristics in the message, such as a characteristic which allows the message to be authenticated and the outcome or outcomes of such authentications. The policy registry securely stores the policy information for each sender in the domain policy database in a step 710. This storage can be part of or separate from the DNS. The policy registry generates a policy file that, in the present embodiment, contains all of the domains and associated policies of every sender at a step 712. The policy file can be generated on a frequent basis automatically or manually, as needed when information is updated, periodically or in some other suitable manner.

Each receiver can securely access the policy file containing the list of domains and associated policies, at steps 714*a*-714*n*. Each receiver can incorporate the policies in the policy file into the individual receiver's message handling process, as shown in steps 716*a*-716*n*. When messages arrive at each receiver purporting to be from one of the domains included in the policy file, the receiver will act upon the instructions in the policy file. The receiver can apply the specific sender's recommended action from that sender's sender specified policy set from the policy file, based on characteristics of the email message. Although three or more senders and three or more receivers are shown in this embodiment, fewer senders and/or receivers can be included.

Figure 8:
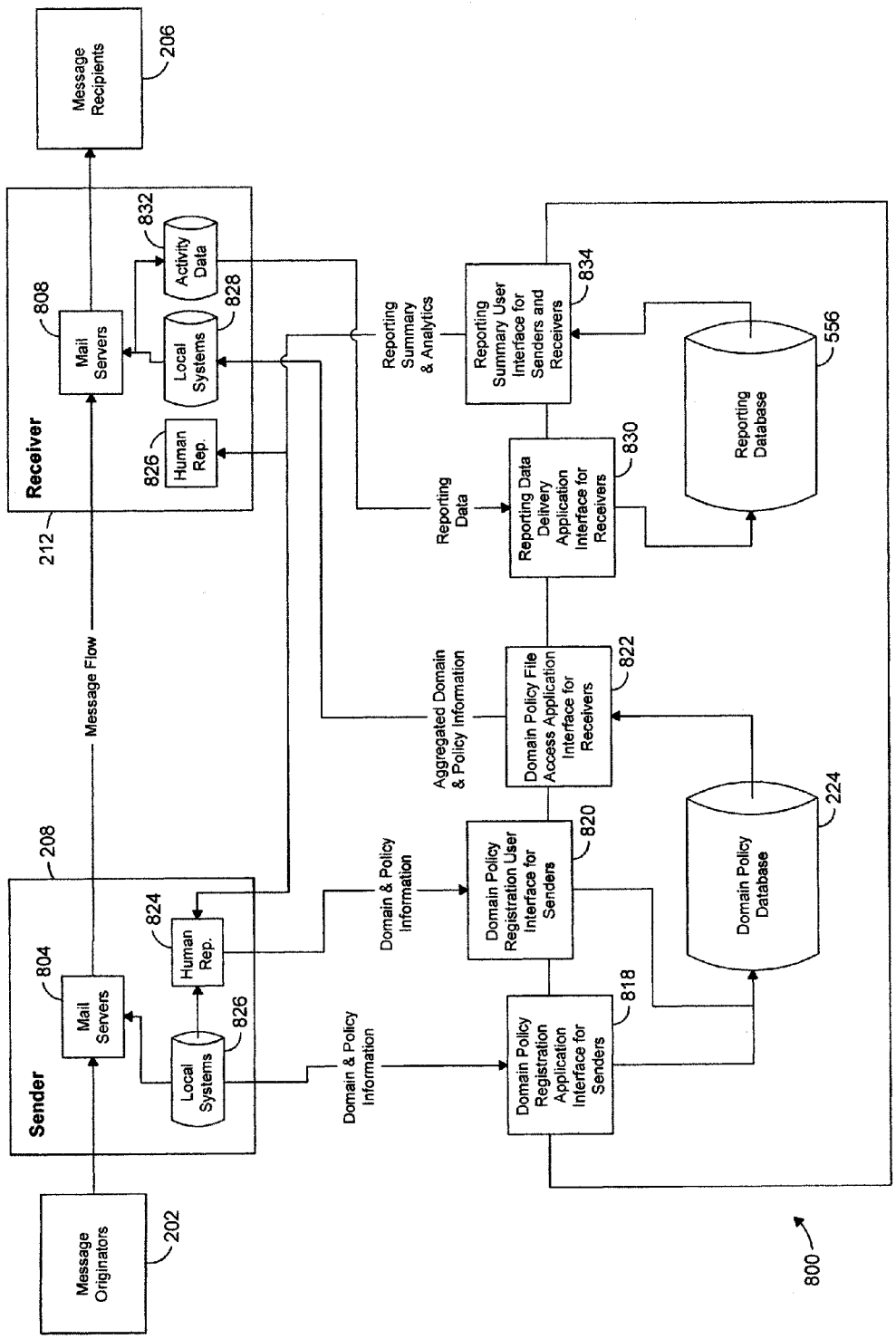
FIG. 8 illustrates an embodiment of an email message domain authentication policy and reporting repository system in a block diagram.

FIG. 8 is a block diagram of one embodiment of an email policy system 800 on which the methods illustrated by the flow diagrams of FIGS. 2-7 are operable. In this embodiment, message originator 202 sends an email message via a mail server 804 in a sender 208. The sender passes the message to a mail server 808 in receiver 212 which delivers the message to message recipient 206 if the receiver deems the message appropriate for delivery. The email policy system in FIG. 8 is shown with a single sender and single receiver for purposes of simplifying the diagram, however, the email policy system can be connected with multiple senders and multiple receivers.

Email policy system 800 operates to determine if the message is appropriate for delivery or for some other action, and tracks the results of those actions. Email policy system 800 includes the domain policy database 224 for storing domains and associated polices for those domains from the senders. Email policy system 800 also includes reporting repository or database 556 for storing message handling data from the receiver.

The domain policy database has three primary interfaces: a domain policy registration application interface for senders 818; a domain policy registration user interface for senders 820; and a domain policy file access application interface for receivers 822. The first two interfaces, 818 and 820 are for the input of domain and policy data by the senders. Domain policy registration user interface 820 enables a human representative 824 from the sender to securely log onto the system and register domains and the policies to be associated with those domains. Representative 824 collects internal domain and policy data from a local system 826 of the sender and inputs that information into domain policy database 224 through domain policy registration user interface 820. The sender can also input domains and polices via domain policy registration application interface for senders 818 which can be a web services application for senders to provide data electronically to domain policy database or repository 224.

The third interface to domain policy database 224 is domain policy file access application interface for receivers 822 which enables multiple receivers (only one shown in this example) to electronically access aggregated domain and policy information from multiple senders via a policy file. The receivers can include these instructions in a local system 828 which can vary from receiver to receiver and which system then drives message handling processes within receiver's mail server 808 for messages from listed domains.

The second main component of email policy system 800 is reporting database 556. The reporting database electronically collects information from the receivers via a reporting data delivery application interface for receivers 830. The receivers collect activity data 832 regarding their message handling activity and electronically deliver that activity data to the reporting database via reporting data delivery application interface for receivers 830. The other major interface to reporting database 556 is a reporting summary interface for senders and receivers 834 which allows a human representative 836 from the receiver as well as human representative 824 from the sender to securely access the aggregated message handling data and analytics, as appropriate, for the domains owned or messages handled.

Figure 9:
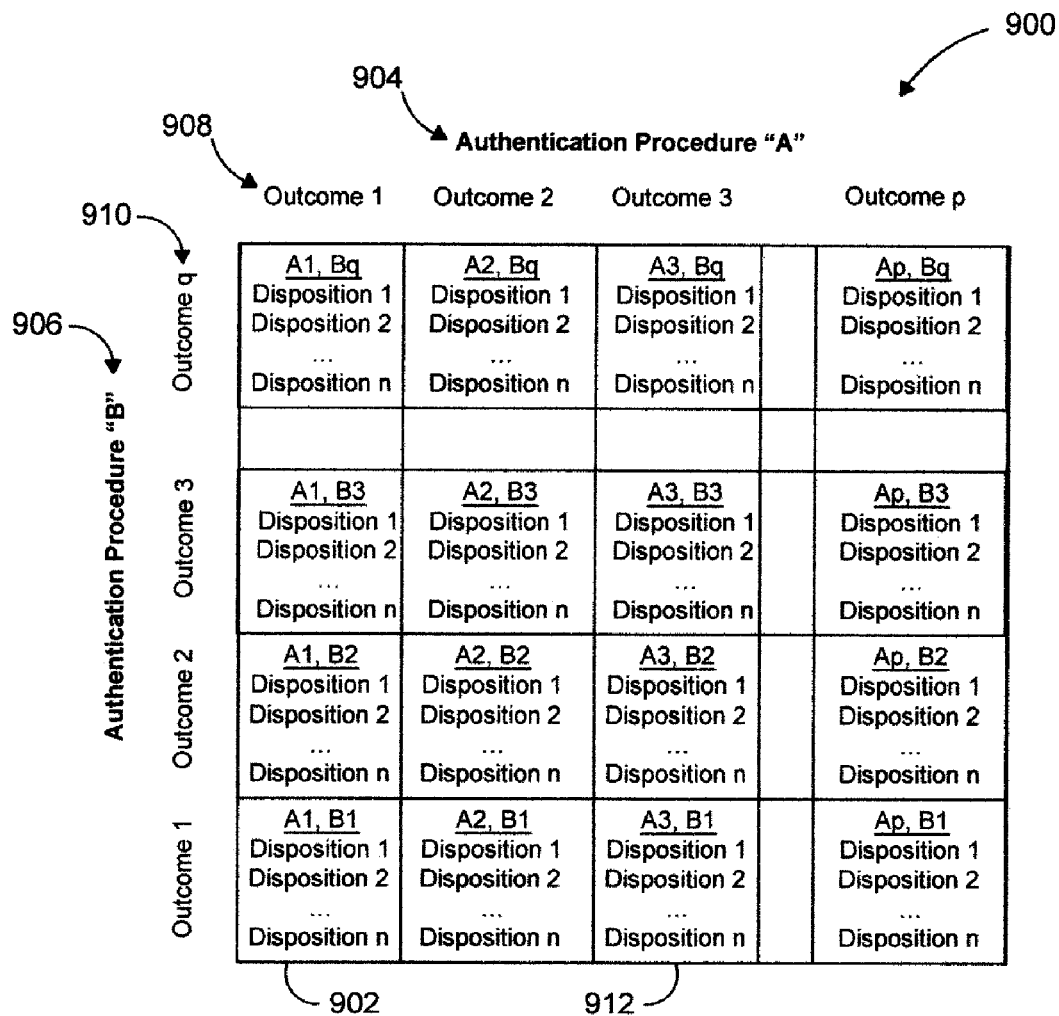
FIG. 9 illustrates one embodiment of an email message policy configuration system.

FIG. 9 is a diagram of one embodiment of a configuration system 900 for configuring a policy set with recommended actions that can be chosen based on one or more characteristics of the email message. In this embodiment, the recommended actions are sender recommended disposition for the receiver to take on the email message based on two characteristics of the message each of which allow the message to be authenticated using a different authentication technique. The configuration system in this embodiment allows the sender to define a complete policy set for all potential disposition actions based on every possible authentication outcome combination. Each policy in this embodiment is an authentication outcome combination and a requested disposition action based on the authentication outcome combination. Configuration system 900 provides predefined sets of available policies to senders in order to simplify and control the sender's choices of recommended actions. For each of the sender's message domains and subdomains the sender selects a single disposition action for each possible authentication outcome combination, thus forming a sender specific policy for each domain and subdomain. The aggregation of each of these policies for a sender is known as the sender specific policy set which is communicated to receivers to apply to the messages they receiver that purport to be from the sender.

A table 902 presents a complete set of combined possible outcomes for two authentication procedures, authentication procedure "A" 904 and authentication procedure "B" 906. Authentication procedures 904 and 906 can be any sender authentication procedures, such as DKIM or SPF, or others. In other embodiments, there can be more than two characteristics of the message used for determining the recommended action, in which case the table would include as many dimensions as there are characteristics used, or as in this case, as many dimensions as authentication techniques. A multidimensional table could include n different authentication techniques, such as shown in steps 326a-326n in FIG. 3; or n different authentication techniques and additional analysis of the message, such as is shown in steps 406a-406n and 408 in FIG. 4, for example.

Each authentication procedure has a predetermined number of possible outcomes that are specific to that authentication procedure. In table 902, authentication procedure 904 has "p" potential outcomes 908 and authentication procedure 906 has "q" potential outcomes 910. Outcomes for these authentication procedures can include results such as "pass", "fail due to expired key", "fail due to bad key format", and others.

To create a sender specific policy for a domain or subdomain, the sender specifies a particular disposition for a message for each combination of procedure outcomes. Each square in table 902 represents a potential combination of outcomes for a given message and lists all the possible disposition actions for the message. The sender can request any of the possible disposition actions, of which there are "n" in this embodiment, for any combination of procedure outcomes. The disposition actions are independent from the procedure outcomes. In one example, available dispositions for a message where the outcome of authentication procedure A (904) was Outcome 3, and where the outcome of authentication procedure B (906) was Outcome 1 the available dispositions are 1 through n, as shown in square 912. In this embodiment, the sender picks one of the n dispositions for each of the possible outcome combinations of the authentication procedures to communicate to the receivers.

Figure 10:
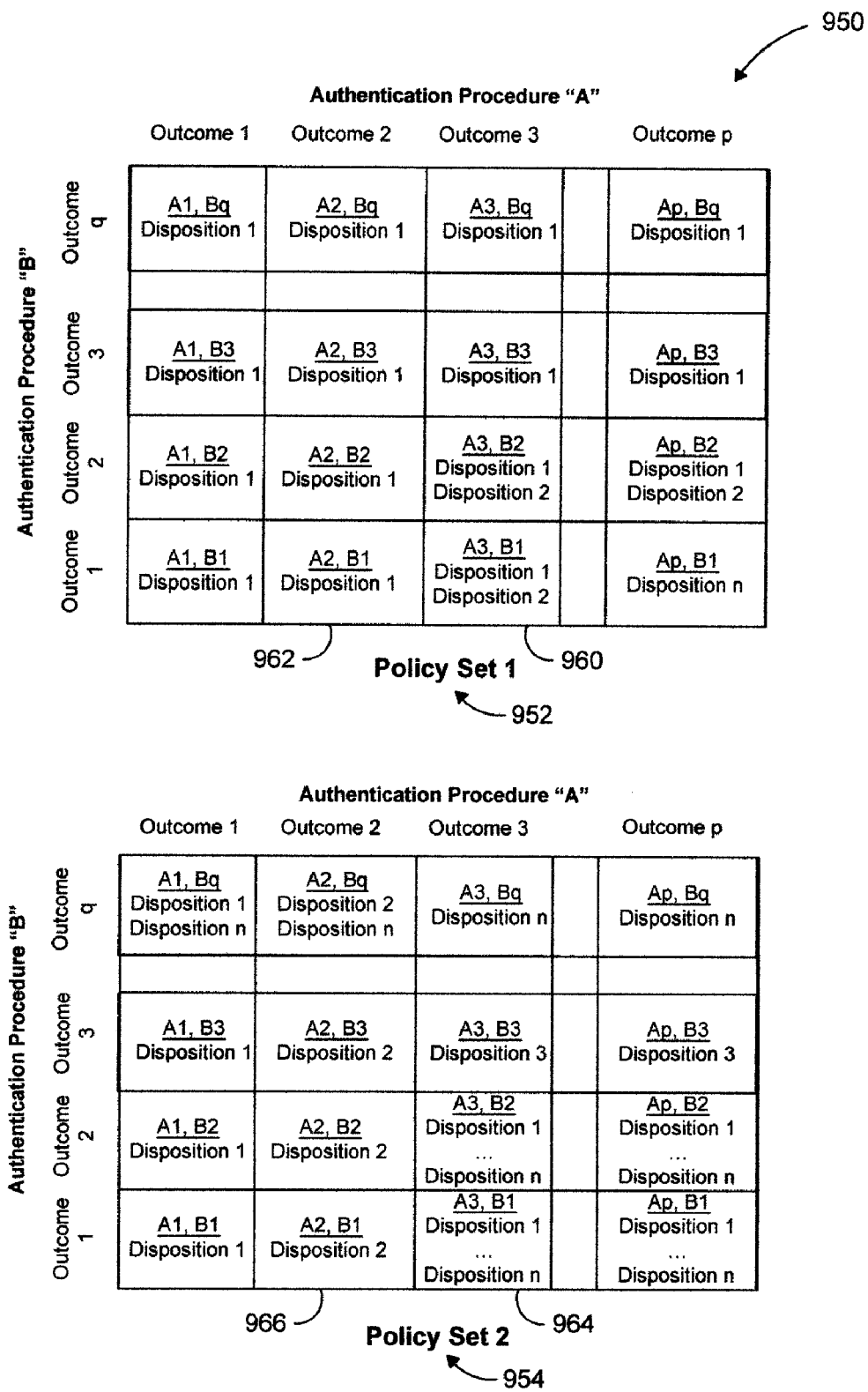
FIG. 10 illustrates another embodiment of an email message policy configuration system.

FIG. 10 is a block diagram of another embodiment of a configuration system 950 for configuring a policy set with recommended actions based on one or more characteristics of the email message. Also in this embodiment, the recommended actions are sender recommended dispositions for the receiver to take on the email message based on two characteristics of the message, each of which allow the message to be authenticated using a different authentication technique. The configuration system in this embodiment can simplify the disposition options for senders by providing predefined sets of available policies from which the sender can choose. In one embodiment, the predefined sets of policies eliminate some of the recommended actions that are unlikely or irrational from the point of view of an experienced receiver or sender.

Configuration system 950 shows an embodiment in which there are two different predefined sets of available polices: policy set one (952) and policy set two (954), other embodiments may have more available predefined policy sets. Policy set 952 is shown as a table that diagrams possible outcome combinations for authentication procedures "A" and "B" along with one or more dispositions available for each combination of authentication procedure outcomes. Policy set 954 is shown as another table that diagrams possible outcome combinations for authentication procedures "A" and "B" along with a different set of dispositions available for each combination of authentication procedure outcomes. In this embodiment, for each specific domain or subdomain, the sender may choose a specific one of predefined policy sets, 952 or 954. The sender then chooses a specific disposition action for each outcome combination from the dispositions available in the selected set. By choosing sender specific policy for each domain and subdomain, the sender thereby forms a sender specific policy set that covers all of the sender's domains and subdomains.

The available dispositions for each possible authentication outcome combination are shown in the boxes of the tables of FIG. 10. For some of the outcome combinations, there is only one disposition action available, while in other outcome combinations there are multiple possible disposition actions available. The predefined policy set can be chosen in a flexible way with more or less disposition actions available for the various different combinations of authentication outcomes. The predetermined policy set can also be chosen to have a desired single disposition already defined for one or more different authentication outcomes.

For example, if the sender selects predefined policy set 952 for a given domain or subdomain, the sender will still have to choose between a disposition 1 and disposition 2 when the authentication outcome is outcome 3 for authentication procedure A and outcome 1 for authentication procedure B, as shown in box 960 of table 956. However, the sender will not have to choose a disposition if the outcome is outcome 2 for authentication procedure A and outcome 1 for authentication procedure B, as shown in box 962 since the disposition is already predefined as disposition 1.

As another example, if the sender selects predefined policy set 954 for a given domain or subdomain, the sender will have to choose between n possible dispositions when the authentication outcome is outcome 3 for authentication procedure A and outcome 1 for authentication procedure B, as shown in box 964. The sender will have a predefined disposition of disposition 2 with outcome 2 for authentication procedure A and outcome 1 for authentication procedure B, as shown in box 966.

The predefined policy sets serve to coordinate the dispositions for possible authentication outcomes for a given domain or subdomains. This coordination reduces the risk that the sender would choose a set of dispositions that would result in either a message getting delivered to recipients that purported to be from the sender, but was not from the sender, or a set of dispositions where authentic messages from the sender were not delivered to the recipient. The sender chooses a policy set, and the selected corresponding specific dispositions as necessary within that set, for each domain and subdomain to create a sender specific policy set. The sender then communicates or distributes the sender specific policy set to the receivers for use in handling messages purported to be from the sender.

Figure 11:
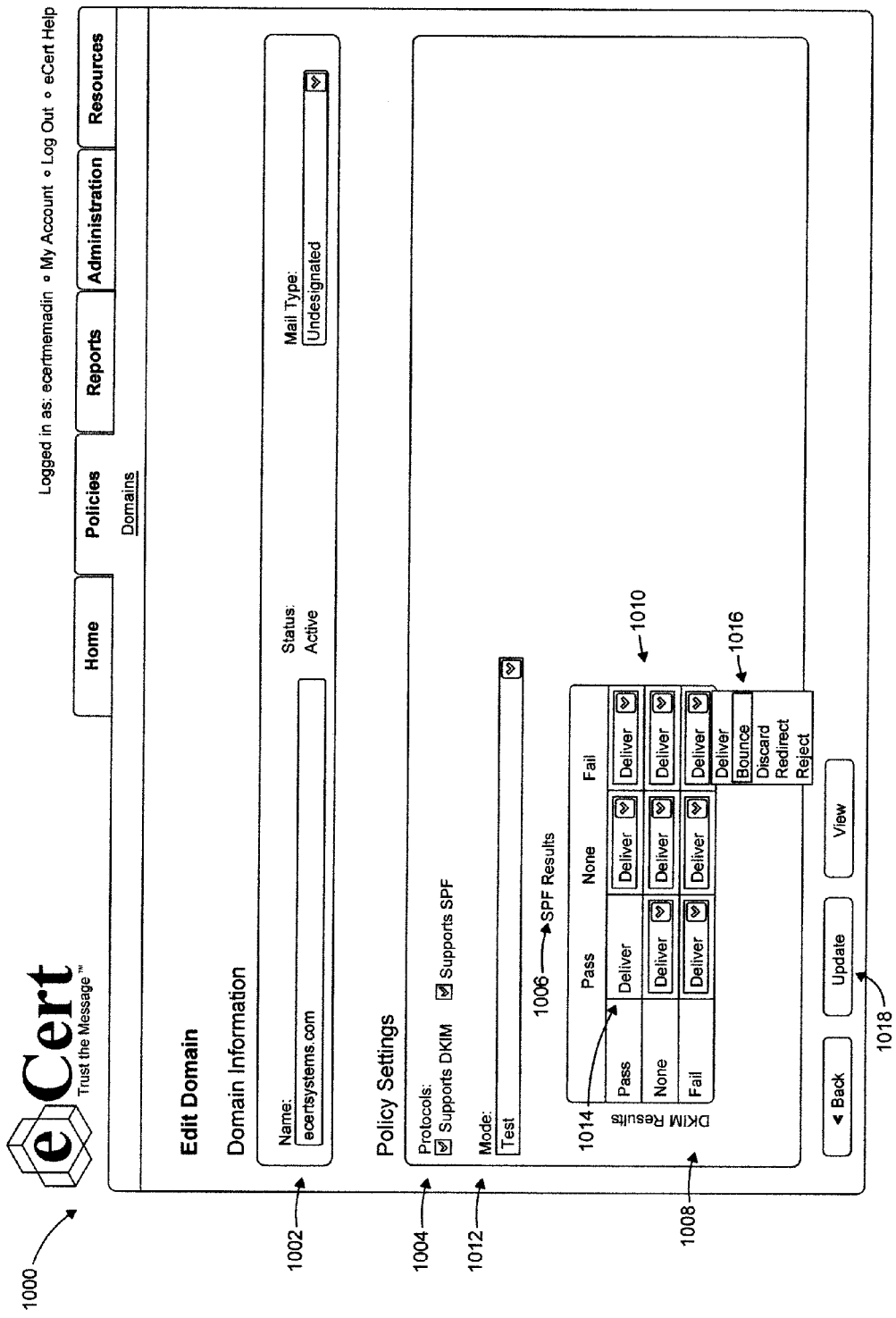
FIG. 11 illustrates an embodiment of a screen image of a policy definition program of a selection process for message policies.

FIG. 11 shows an embodiment of a screen in a policy definition program 1000 for selecting a predefined set of available policies and requested disposition actions available as a selected policy set for a specified domain. In the present example, the sender is choosing options for a domain name called ecertsystems.com as indicated in a name field 1002. The sender can also use program 1000 for any of the domains or subdomains controlled by the sender. The domain in this example supports two authentication procedures or protocols, SPF and DKIM. These characteristics are selected by the sender via checkboxes 1004 and correspondingly appear as headers 1006 and 1008 on a disposition action grid 1010 which is a grid of sender recommended actions in the present embodiment.

After selecting the supported authentication procedures, the sender then selects a predefined set of available polices, in this example referred to as a mode, from a mode field 1012. The mode selected in FIG. 11 is called Test. By choosing this mode, dispositions grid 1010 is filled in by the program with the disposition options for each authentication outcome combination that are then available to the sender given that mode. Header 1006 for the first authentication procedure in the disposition grid is titled "SPF Results" which has three possible outcomes: Pass, None and Fail that are listed at the top of the grid. Header 1008 for the second authentication procedure in the disposition grid is titled "DKIM Results" and also has three possible outcomes: Pass, None and Fail. While these outcomes for SPF and DKIM are the same in the present example, it is not required that either the number of outcomes or the names of the outcomes for the available authentication procedures be the same. It is also not necessary that either one or both of the characteristics be related to authentication of the message. Other characteristics of the message can also be used and other sender recommended actions can also be used in place of disposition of the message. For example, the grid can include entries based on additional analysis step 408 of FIG. 4 or step 608 of FIG. 6. Embodiments in which multiple characteristics are used for determining the sender recommended action involve multidimensional grids which are not readily illustrated.

In the embodiment shown in FIG. 11, each square of disposition grid 1010 gives available options for the combination of authentication outcomes. For example, in the mode called Test if the outcome of the SPF is Pass and the outcome of the DKIM is also Pass as shown in square 1014, then the disposition is already defined for the message to be delivered to the designated recipient. If, on the other hand, the outcome of the SPF is Fail and the outcome of the DKIM is also Fail, as shown in square 1016, then the sender has a number of disposition options: Deliver, Bounce, Discard, Redirect and Reject. Once the sender has finished selecting the options for the specific domain, the sender can click an update button 1018 which distribute the policies for the domain to the receivers.

Figure 12:
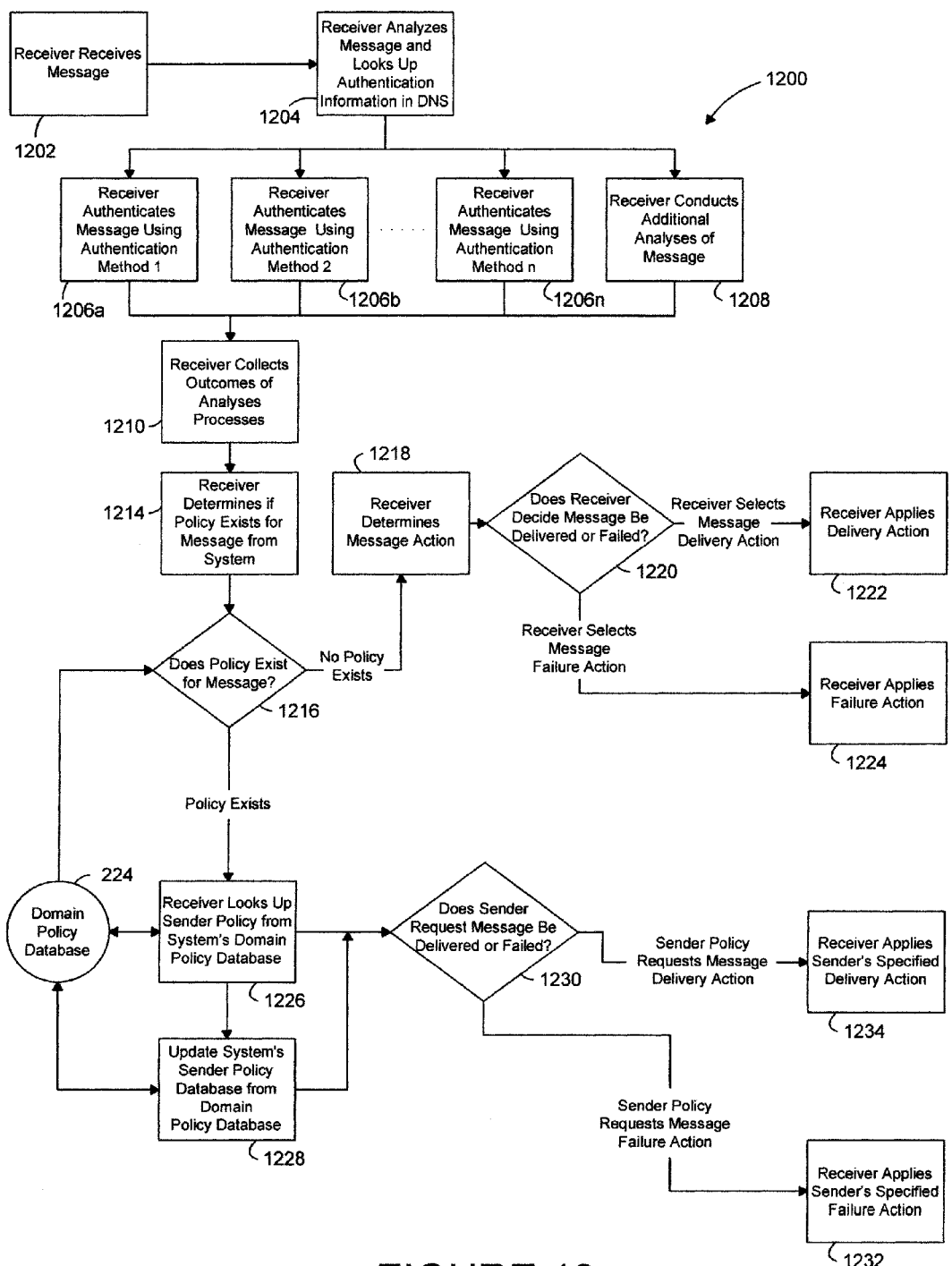
FIG. 12 illustrates still another embodiment of an email message flow for another multiple authentication method.

FIG. 12 shows a flow diagram that illustrates an embodiment of a message flow 1200 as it is received by a receiving network or receiver. The receiver receives the message at a step 1202 from the sender and discerns the relevant domain or subdomain of the message's sender. The receiver then looks up the message sender's domain or subdomain authentication information from the sender's DNS at step 1204. The receiver authenticates the message, using information from the DNS and characteristic information present in the message by a variety of authentication techniques or methods, such as SPF, DKIM or others. The authentication is accomplished in steps 1206a-1206n which are representative of n different authentication steps. The receiver can also conduct, additional, non-authentication based, analysis of the message to determine the message's quality, such as text analysis, or other information in a step 1208. Each of the steps 1206 and 1208 can be conducted independent from one another.

The receiver then collects the results of the outcomes of the various authentication techniques at a step 1210. The receiver determines if the message comes from a domain or subdomain that publishes policy in domain policy database 224 at a step 1214. The receiver checks the domain policy database for the existence of a policy from the sender for the message at a step 1216.

If the message comes from a sender's domain or subdomain that does not publish policy, then the receiver can then determine the action for the message at a step 1218. In this case, the receiver decides whether to apply a delivery or failure action for the message at a step 1220. If the receiver decides to apply a delivery action to the message, the receiver can choose from a variety of delivery actions to apply to the message, at step 1222, such as "deliver to inbox" or "deliver to spam folder". If the receiver decides to apply a failure action to the message, the receiver can choose from a variety of failure actions to apply to the message, at step 1224, such as "discard", "bounce", or "reject".

If, on the other hand, the message comes from a sender's domain that does publish policy, the receiver looks up the sender's policy from domain policy database 224 at step 1226. If the receiver's internal cache is outdated, the receiver can electronically update the internal cache from domain policy database 224 at a step 1228. The receiver then determines what type of action the sender request, at step 1230, in this instance either a delivery action or a failure action. If the sender requests a failure action, the receiver applies the failure action to the message at a step 1232. If the sender requests a delivery action, the receiver applies the deliver action to the message at a step 1234.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a system that is interfaced through the Internet for use in conjunction with email messaging, in the system at least one originator sends at least one email message, via a sender, to at least one recipient as an addressee of the email message, the email message is deliverable to the recipient via a receiver of the email message, a method comprising:
   configuring a policy repository for storing at least one set of policies that is defined by said sender, wherein the policy repository includes at least one recommended action to be taken on said email message by said receiver based on at least one characteristic of the email message;
   facilitating a controlled access to said policy repository by the sender to define the set of policies; and
   distributing the set of policies to the receiver by providing controlled access to the policy repository by said receiver in order to allow the receiver to determine at least one sender recommended action for the email message from the sender based on the characteristic of the email message.

2. A method according to claim 1 wherein there are a plurality of senders and the policy repository is configured for storing a plurality of sets of policies from the plurality of senders and the controlled access to the policy repository is facilitated for the plurality of senders to each define at least one of the sets of policies.

3. A method according to claim 2 wherein the plurality of senders send a plurality of messages and wherein distributing the set of policies to the receiver includes enabling remote access to the policy repository by the receiver for querying of policy information within the policy repository of the multiple senders and for the multiple messages.

4. A method according to claim 1, wherein receiver takes a receiver action on the message based on the sender recommended action and the message characteristic, further comprising:
configuring a reporting repository to collect information from the receiver on the characteristic of the message and the receiver action taken on the message.

5. A method according to claim 4 wherein the policy repository and the reporting repository are both configured on a single storage device.

6. A method according to claim 4 wherein the characteristic of the message includes information used for authenticating the message and the recommended action involves disposition of the message and wherein the reporting repository is configured to collect the information from the receiver.

7. A method according to claim 1, wherein there are a plurality of receivers that each receive at least one of a plurality of messages sent from a plurality of different senders, where each message has at least one message characteristic and wherein the policy repository is configured for storing multiple sets of policies from the senders and wherein controlled access is facilitated to the policy repository for the senders to so that each sender defines at least one of the sets of policies.

8. A method according to claim 7, wherein each of the receivers takes a receiver action on the received message based on the sender recommended action and the message characteristic of each message, further comprising:
configuring a reporting repository to collect information from the plurality of receivers on the message characteristics and the receiver actions taken on the plurality of messages.

9. A method according to claim 8, further comprising:
classifying the information collected according to a common set of parameters.

10. A method according to claim 9 including selecting the parameters to include outcomes of authentications of the plurality of messages.

11. A method according to claim 9 including selecting the parameters to include a time at which the messages arrive at the receivers.

12. A method according to claim 9 including selecting the parameters to include summary statistics related to the plurality of messages.

13. A method according to claim 9 including selecting the parameters to include a listing of the plurality of different senders.

14. A method according to claim 9, further comprising:
displaying the information collected on an electronic graphical user interface.

15. A method according to claim 14 including displaying the information graphically to the sender.

16. A method according to claim 14 including displaying the information graphically to at least one receiver.

17. A method according to claim 14 including displaying the information numerically to the sender.

18. A method according to claim 14 including displaying the information numerically to at least one receiver.

19. A method according to claim 8, further comprising:
applying a set of rules to the information collected to identify potential security threats to the senders.

20. A method according to claim 19, further comprising:
generating an electronic alert to notify the senders of one or more identified potential security threats.

21. A method according to claim 8, further comprising:
applying a set of rules to the information collected to identify potential security threats to the receivers.

22. A method according to claim 21, further comprising:
generating an electronic alert to notify the receivers of one or more identified potential security threats.

23. A method according to claim 8 including applying an authentication technique to the plurality of messages to authenticate the messages and wherein at least one of the messages fails the authentication and wherein the information collected includes Internet addresses contained in the message that fails the authentication.

24. A method according to claim 8 including configuring the reporting repository to collect Internet protocol address information.

25. A method according to claim 8 including configuring the reporting repository to collect uniform resource locator information.

26. A method according to claim 1 wherein facilitating controlled access to the policy repository by the sender includes encrypting information submitted to the policy repository by the sender and storing the encrypted sender submitted information.

27. A method according to claim 1 wherein distributing the set of policies to the receiver includes encrypting information for receipt by the receiver from the policy repository relating to the set of policies.

28. A method according to claim 1 including encrypting all information stored in the policy repository.

29. A method according to claim 1 wherein the set of policies is defined by the sender using a graphical user interface with tools for selecting one or more characteristics and one or more corresponding recommended actions.

30. A method according to claim 1 wherein the set of policies is defined by the sender by accessing data from a local system of the sender through an application program interface.

31. A method according to claim 1 wherein the characteristic of the message is used for authenticating a purported domain of origin of the message.

32. A method according to claim 1 wherein the characteristic of the message is used for authenticating a purported subdomain of origin of the message.

33. A method according to claim 1 wherein the set of policies include information for domain wildcarding.

34. A method according to claim 1 wherein the characteristic of the message is used for authenticating a purported internet protocol address of the origin of the message.

35. A method according to claim 1 wherein there are multiple characteristics of the message which are used for authenticating a purported internet protocol address of the origin of the message and a purported domain of origin of the message.

36. A method according to claim 1 wherein the receiver receives a plurality of messages from the Internet, some of which are from the sender and some of which are not from the sender but are forged to appear as if they are from the sender and wherein the receiver applies the set of policies defined by the sender to messages received by the sender and applies the set of polices defined by the sender to the forged messages.

37. A method according to claim 1 wherein the sender defines the recommended action in the policy set as a disposition of the email message based on the characteristic of the message.

38. A method according to claim 37 including defining the recommended action as instructions for discarding the message.

39. A method according to claim 37 including defining the recommended action as instructions for marking the message as spam.

40. A method according to claim 37 including defining the recommended action as instructions for rejecting the message.

41. A method according to claim 37 including defining the recommended action as instructions for delivering the message.

42. A method according to claim 37 including defining the recommended action as instructions for certifying the message.

43. A method according to claim 1 wherein the sender defines the recommended action in the policy set to include displaying additional information to the recipient about the email message.

44. A method according to claim 1 wherein the sender defines the recommended action in the policy set to restrict content allowed in the message.

45. A method according to claim 1 wherein the sender defines the recommended action in the policy set to include alteration of the message in a predetermined way.

46. A method according to claim 1 wherein the sender defines the recommended action in the policy set to include converting the message to another protocol format.

47. A method according to claim 1 wherein the sender defines the recommended action in the policy set to include assigning the message to a thread.

48. A method according to claim 1 wherein the sender defines the recommended action in the policy set to include duplicating the message.

49. A method according to claim 1 wherein the sender defines the recommended action in the policy set to include archiving the message.

50. A method according to claim 1 wherein the sender defines the recommended action in the policy set to include classifying the message.

51. A method according to claim 1 wherein the sender defines the message characteristic in the policy set to include authentication information for authenticating the message.

52. A method according to claim 1 wherein the sender defines the message characteristic in the policy set to include header information.

53. A method according to claim 1 wherein the sender defines the message characteristic in the policy set to include information generated in the delivery process of the message.

54. A method according to claim 53 wherein the sender defined message characteristic includes envelope domain information.

55. A method according to claim 1 wherein the sender defines the message characteristic in the policy set to include content of a body portion of the message.

56. A method according to claim 1 wherein the sender defines the message characteristic in the policy set to include information related to attachments to the message.

57. A method according to claim 1 wherein the sender defines the message characteristic in the policy set to include a geographic location of a host of the sender.

58. A method according to claim 1 wherein the set of policies is associated with a particular domain that sent the email message.

59. A method according to claim 1 wherein the policy repository is configured for storing a plurality of sets of polices from a plurality of senders where each set of policies is from one of the senders.

60. A method according to claim 1 wherein the set of policies is distributed to a plurality of different receivers.

61. A method as defined in claim 1, wherein there are a plurality of receivers that each receive at least one of a plurality of messages sent from a plurality of different senders and wherein the policy repository is configured for storing multiple sets of policies from the senders and wherein controlled access is facilitated to the policy repository for the senders to so that each sender defines at least one of the sets of policies, and wherein each of the receivers takes a receiver action on each of the respective received messages based on the sender recommended action and the message characteristic of each message, and further comprising:

configuring a reporting repository to collect information from the plurality of receivers on the message characteristics and the receiver actions taken on the plurality of messages and reporting the information collected in a predetermined way.

62. A method as defined in claim 1 wherein there are multiple characteristics of the email message that include information used in multiple different authenticating techniques for authenticating the email message and the recommended action is for disposition of the email message and is based on outcomes of the multiple authentications.

63. A method as defined in claim 62 wherein the multiple characteristics of the email message also includes non-authenticating information that is not used in authenticating techniques and the recommended disposition of the email message is based on the outcomes of the multiple authentications and on the non-authenticating information.

64. A method as defined in claim 63 wherein the non-authenticating information includes an Internet Protocol address in the message.

65. A method as defined in claim 62 wherein the multiple different authenticating techniques include Domainkeys Identified Mail and Sender Policy Framework.

66. A method as defined in claim 62 wherein the recommended action in the policy set is a delivery action when the email message is authenticated with the multiple different authenticating techniques.

67. A method as defined in claim 62 wherein the recommended action in the policy set is a failure action when the email message is not authenticated with the multiple different authenticating techniques.

68. A method as defined in claim 62 wherein the recommended action in the policy set is a pass action if the message passes at least one of the multiple authentications.

69. A method as defined in claim 62 wherein the recommended action in the policy set is a pass action only if the message passes all of the multiple authentications.

70. A method as defined in claim 1 wherein configuring the policy repository includes configuring a domain name system for storing the set of policies along with associated domain names.

71. A method as defined in claim 1, further comprising:

configuring a receiver policy cache in the receiver to store the set of policies distributed from the policy repository and wherein the receiver determines the sender recommended action for the email message by accessing the receiver policy cache.

72. A method as defined in claim 71 wherein the receiver policy cache is updatable by accessing the policy repository.

73. An email message system that is interfaced through the Internet for use in conjunction with email messaging, in the system at least one originator sends at least one email message, via a sender, to at least one recipient as an addressee of the email message, the email message is deliverable to the recipient via a receiver of the email message, said system comprising:

a policy repository configured for storing at least one set of policies that is defined by said sender, wherein the policy repository includes at least one recommended action to be taken on said email message by said receiver based on at least one characteristic of the message;

a sender interface for sender communication with the policy repository for facilitating controlling access to the policy repository by the sender to define the set of policies; and a receiver interface for receiver communication with the policy repository for distributing the set of policies to the receiver by providing controlled access to the policy repository by said receiver in order to allow the receiver to determine at least one sender recommended action for the email message from the sender based on the characteristic of the email message.

74. A system according to claim 73, wherein the receiver interface is arranged to connect a plurality of different receivers to the policy repository so that each of the receivers can determine at least one sender recommended action for the email message from the sender based on the characteristic of the email message.

75. A system according to claim 73 wherein the sender interface is arranged to connect a plurality of different senders to the policy repository so that each sender can define at least one set of policies, and wherein the policy repository is configured for storing a plurality of different sets of policies.

76. A system according to claim 73 wherein the policy set stored in the policy repository includes a plurality of characteristics for authenticating the email message using a plurality of different authentication techniques in the receiver and the sender recommended action for the receiver is based on outcomes of the plurality authentication techniques.

77. A system according to claim 73 wherein the sender interface is configured to facilitate controlled access to the policy repository through the Internet.

78. A system according to claim 73 wherein the receiver interface is configured to distribute the set of policies to the receiver through the Internet.

79. A system according to claim 73, wherein the receiver is configured for collecting information about the email message, the system further comprising:

a reporting database configured for storing the collected information from the receiver about the email message; and a reporting database interface for facilitating controlled access to the reporting database by the receiver so that the receiver can store the collected information in the reporting database.

80. A system according to claim 79 wherein the reporting database interface is further configured to facilitate controlled access to the reporting database by the sender so that the sender can access the collected information about the email message.

81. A system according to claim 79, further comprising:

a graphical user interface for displaying the collected information.

82. A system according to claim 73 the receiver receiving a plurality of messages from the Internet, some of which are from the sender and some of which are not from the sender but are forged to appear as if they are from the sender, and wherein the set of policies stored in the policy repository are configured to be applied to the messages received by the sender and applied to the forged messages.

* * * * *